UNITED STATES PATENT OFFICE.

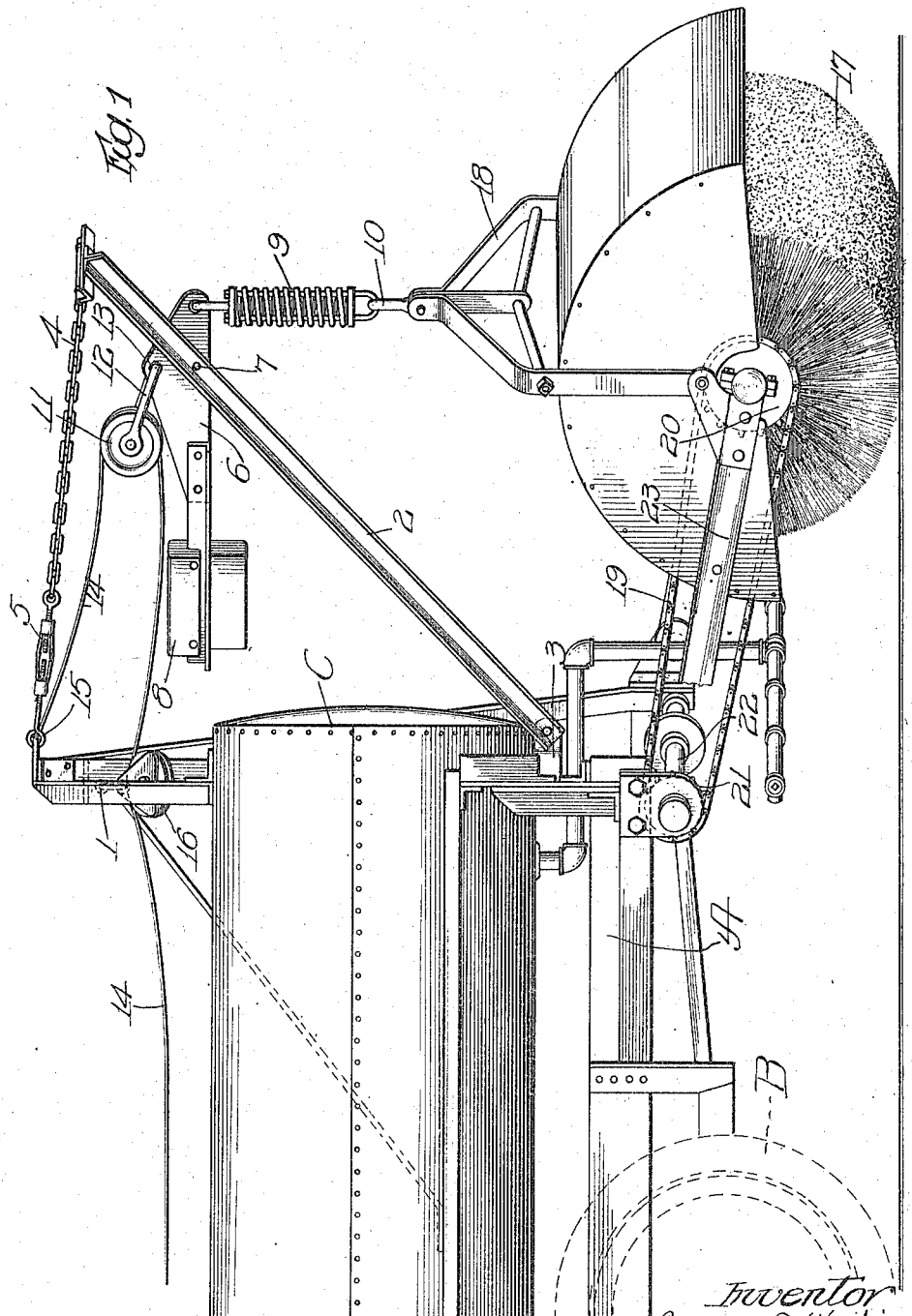

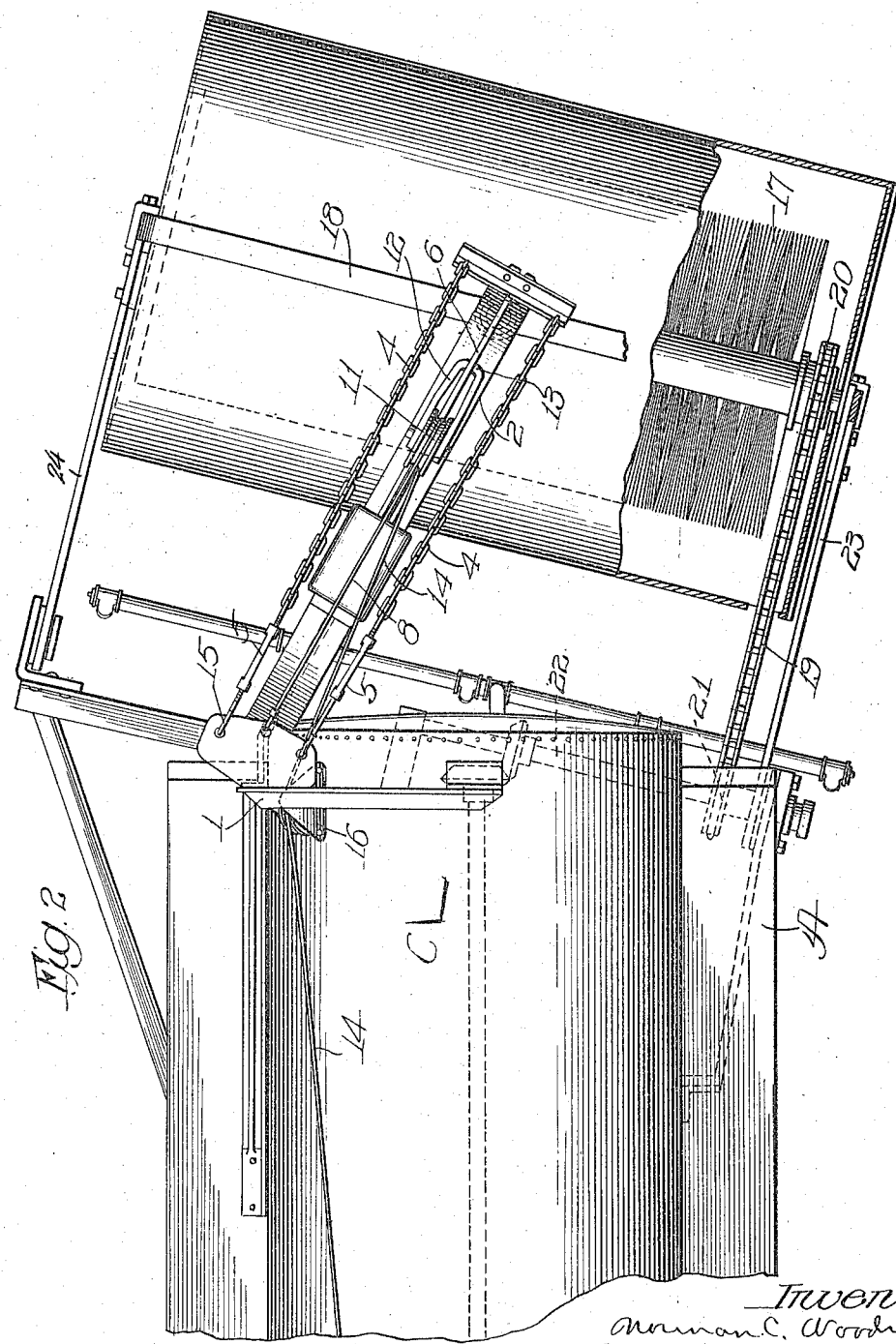

NORMAN CHAS. WOODIN, OF OSHKOSH, WISCONSIN, ASSIGNOR TO FREDERICK C. AUSTIN, OF CHICAGO, ILLINOIS.

STREET-SWEEPER-BROOM SUPPORT.

1,286,481.	Specification of Letters Patent.	Patented Dec. 3, 1918.

Application filed September 24, 1917. Serial No. 192,882.

*To all whom it may concern:*

Be it known that I, NORMAN C. WOODIN, a citizen of the United States of America, and resident of Oshkosh, Winnebago county, State of Wisconsin, have invented a certain new and useful Improvement in Street-Sweeper-Broom Supports, of which the following is a specification.

My invention relates to street-sweepers in general, but more particularly to those which are used in combination with street sprinklers, and more especially to those in which the sweeping brush is arranged in the rear of the sprinkler nozzles.

Generally stated, the object of my invention is to provide a novel and improved construction and arrangement for supporting the sweeping brush.

Special objects are to support the said brush in such a manner that it will have a floating action, so to speak, being free to rise and fall while traveling over the uneven surface of the street, and whereby the said sweeping brush or broom may be raised at will, to a sufficient height above the street, when the use thereof is not required.

To this and other useful ends, my invention consists in matters hereinafter set forth and claimed.

In the accompanying drawings,

Figure 1 is a side elevation of a street sweeping apparatus embodying the principles of my invention, showing the rear end of the street sprinkler upon which the sweeping apparatus is hung.

Fig. 2 is a plan of the apparatus and construction shown in Fig. 1. As thus illustrated, my invention comprises a street sprinkler body A, mounted on wheels B and provided with a tank C for the sprinkling liquid. The front part of the vehicle may be of any suitable character, and the sprinkler nozzles may be arranged in any suitable or desired manner.

The construction and apparatus of the street sweeper attachment comprises a supporting frame 1 suitably secured to the rear end portion of the sprinkler body. A supporting boom 2 is pivoted at its lower end to a bracket 3 on the rear end of the sprinkler body, and has its upper end connected by parallel chains 4 and turn-buckles 5 with the upper end of the support 1, whereby this boom extends obliquely (see Fig. 2), when viewed from above. A counter balance lever arm 6 is pivoted at 7 on the boom 2, and is provided at its inner end with a weight 8, and at its outer end with a depending spring 9 having a connecting device 10 at the lower end thereof. A sheave 11 has its bail 12 pivoted at 13 on the upper portion of the counter balance arm 6, and engages the line 14, which latter has one end thereof secured to the support 1 at 15, and, after passing around the sheave 11, extends forward and is supported by the sheave 16 mounted on said support, whereby a forward pull on this line will raise the boom. Of course, as the pivoted portion of the counter-balance 6 is like a bell-crank, with the three pivotal points at the three corners of a right angle triangle, additional pull on the flexible connection 14 will tilt the weight 8 downward, and will tilt the short rear end of the counter-balance upward, and a continued pull on said connection will raise the boom. The brush or broom 17 is preferably cylindric, and is suitably mounted on a bail shaped support 18, the latter in turn being supported by the device 10 previously mentioned. A sprocket chain 19 connects the sprocket 20 on one end of said brush or broom with a sprocket wheel 21 on the driving shaft 22, which latter is supported in suitable bearings on the rear end of the sprinkler body, and is driven through the medium of any suitable connection with the engine at the forward end of the vehicle, the latter being in the nature of an automobile truck. Swinging arms 23 and 24 connect the ends of the brush or broom with the rear end of the sprinkler body, so that these arms swing up and down about an axis coincident with the axis of the shaft 22, whereby the brush or broom has a floating action, so to speak, being free to move up and down as it travels over the uneven surface of the street or road.

In operation, the brush or broom can be raised from the surface of the street by operating the line 14, so that the boom 2 will be pulled upward and the brush or broom will be raised the desired distance. The spring 9 relieves the supporting apparatus of shock when the brush or broom moves suddenly downward. The construction and arrangement shown and described permits the brush or broom 17 to move freely up and down, while in operation, so that it will pass over obstructions, and will drop into hollow places in the paving, thereby insuring a proper sweeping action. The boom 2 can be adjusted up and down by operating the turnbuckle 5, thereby to regulate the pressure or action of the brush or broom on the surface of the street, and to take up wear when the broom becomes worn.

In practice, of course, the forward end of the line 14 will be wound upon a drum (not shown) at the forward end of the vehicle, within reach of the driver, and means will be provided for operating said drum to wind or unwind the line. A sudden pull on this line will tilt the weight 8 downward, depending upon the length of the counter balance arm and the size of said weight, which will quickly raise the broom, and a continued pull on the line will then raise the boom 2, thus lifting the broom the required distance from the ground.

The broom 17 will swing freely up and down, not passing over uneven surfaces; at such time the weight 8 is free to swing up and down between the two parallel chains 4, the line 14 being allowed to remain slack at this time so that it will not interfere with the free up and down movements of said weight.

With the construction shown and described, it will be seen that the arms 23 and 24 constitute a draft device or draft connection between the broom and the rear end of the vehicle body. In this way, the boom 2 sustains no part of the draft, and does not pull the broom forward along the ground. This boom 2 extends upwardly and rearwardly, and serves merely as a support for the counterbalance 6 upon which the broom is suspended, so that this boom 2 sustains the weight of the broom, particularly when the broom is raised from the ground, but the draft connections 23 and 24 are directly connected to the body of the vehicle to pull the broom forward along the surface of the street. The counter-balance 6 serves, it will also be seen, as the medium of connection between the boom 2 and the raising and lowering instrumentalities, inasmuch as the line or cable 14 is connected around the sheave 11 which is carried by the counter-balance, so that when a forward pull is exerted on this line or cable the lifting power is communicated through the counter-balance to the boom, whereby the mechanism by which the broom is suspended on the boom constitutes the medium of connection between the boom and the lifting means.

Furthermore, the spring 9, it will be seen, is disposed over the intermediate portion of the broom 17, and is connected to the upper end of the bail 18, whereby the broom is balanced and will move up and down bodily, and will not tend to tilt down first at one end and then at the other, which would be objectionable. Also, it will be seen that the chains 4 limit the downward movement of the boom 2, and that the turn-buckles 5 serve to variably limit this outward and downward movement of the boom, thereby to change the height of the broom.

What I claim as my invention is:

1. In a street sweeper, a vehicle body, a rotary broom to sweep the street behind said body, a lifting boom extending upwardly and rearwardly from the rear end of said body, means to support said boom in position, mechanism on the upper portion of said boom to support said broom for free floating or up and down movement while passing over the surface of the street, a draft connection from said body to the broom, and a connection to said mechanism to raise the upper end of said boom and thereby lift the broom off the street.

2. A structure as specified in claim 1, in which said mechanism includes a counter balance arm pivoted on said boom to form a tilting support for said broom.

3. A structure as specified in claim 1, in which said mechanism comprises a tilting counter balance arm, and in which said connection includes a line and a sheave on said counter balance arm to engage said line, so that a forward pull on said line will swing said boom upward and raise the broom.

4. A structure as specified in claim 1, in which said means are adjustable above said mechanism to variably limit the downward swing of the outer end of said boom.

5. In a street sweeper, the combination of a vehicle body, a support on the rear end of said vehicle body, a boom pivoted at its lower end to the vehicle body, a flexible connection between the upper end of said boom and the upper end of said support, an arm pivoted on said boom, a counter balance weight on said arm, a rotary broom, means to support said broom on said arm, means to operate said arm to lift the broom off the street, pivoted arms for the opposite ends of said broom, and a driving connection for said broom, substantially as shown and described.

6. The improved street sweeper, substantially as shown and described, comprising a broom, a counter-balance to support said broom, and means for lifting said counterbalance bodily to raise said broom.

7. In a street sweeper, the combination of a vehicle body, a rotary broom disposed behind said body, a draft connection from said broom to the rear end of said body, said connection being adapted to swing up and down to give the broom a floating action on the surface of the street, and to permit raising of the broom, a pivoted boom extending upwardly and rearwardly from the rear end of said body, so that the upper portion of said boom extends over the broom, a counterbalance pivoted on said boom, a yoke for said broom, a spring for connecting said counter-balance with said yoke, a sheave connected to said counter-balance, a flexible connection engaging said sheave and arranged for raising and lowering the boom, and means to limit the downward movement of the boom.

8. A structure as specified in claim 7, said counter-balance being provided with a weight which occupies a position between the boom and the vehicle body, said sheave being disposed over the counter-balance, and said flexible connection extending over said weight, so that a pull on said flexible connection tilts the rear end of the counter-balance upward and its weighted end downward, and whereby a continued pull on the said flexible connection raises the boom.

Signed by me at Chicago, Cook county, Illinois, this 7th day of September, 1917.

NORMAN CHAS. WOODIN.